(12) United States Patent
Liu et al.

(10) Patent No.: US 10,846,052 B2
(45) Date of Patent: Nov. 24, 2020

(54) COMMUNITY DISCOVERY METHOD, DEVICE, SERVER AND COMPUTER STORAGE MEDIUM

(71) Applicant: TENCENT TECHNOLOGY (SHENZHEN) COMPANY LIMITED, Guangdong (CN)

(72) Inventors: Jiahao Liu, Shenzhen (CN); Guohui Ling, Shenzhen (CN); Zibin Zheng, Shenzhen (CN); Chuan Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 213 days.

(21) Appl. No.: 16/310,920

(22) PCT Filed: Oct. 12, 2017

(86) PCT No.: PCT/CN2017/105956
§ 371 (c)(1),
(2) Date: Dec. 18, 2018

(87) PCT Pub. No.: WO2018/077039
PCT Pub. Date: May 3, 2018

(65) Prior Publication Data
US 2019/0179615 A1     Jun. 13, 2019

(30) Foreign Application Priority Data

Oct. 27, 2016   (CN) .......................... 2016 1 0954505
Oct. 31, 2016   (CN) .......................... 2016 1 0933379

(51) Int. Cl.
*G06F 7/00*     (2006.01)
*G06F 7/24*     (2006.01)
(Continued)

(52) U.S. Cl.
CPC .................. *G06F 7/24* (2013.01); *G06F 7/32* (2013.01); *G06F 16/24578* (2019.01);
(Continued)

(58) Field of Classification Search
CPC .. G06F 16/9536; G06F 16/24578; G06F 7/32; G06F 7/24
(Continued)

(56) References Cited

U.S. PATENT DOCUMENTS 8,606,787 B1 * 12/2013 Asgekar ................ G06F 16/285
707/737
2009/0132561 A1 * 5/2009 Cormode .............. G06F 16/958
(Continued)

FOREIGN PATENT DOCUMENTS

CN     103327092 A     9/2013
CN     104199852 A     12/2014
(Continued)

OTHER PUBLICATIONS

Communication dated Jan. 3, 2020 from the State Intellectual Property Office of the P.R.C. in counterpart Application No. 201610954505.0.
(Continued)

*Primary Examiner* — Md I Uddin
(74) *Attorney, Agent, or Firm* — Sughrue Mion, PLLC (57) ABSTRACT

A community discovery method is provided. The community discover method includes partitioning nodes in a social network into community nodes partitioned into n first communities, each of the n first communities being associated with a corresponding community label, the corresponding label of each of the community nodes initially indicating a first community from among the n first communities to which the community node belongs, and n being an integer greater than or equal to 2; updating the corresponding label
(Continued)

of each community node comprised in the n first communities; and partitioning the community nodes into m second communities, each of the community nodes in each of the m second communities having a same label, and m being a positive integer less than n.

17 Claims, 5 Drawing Sheets

(51) Int. Cl.
    *G06F 7/32*     (2006.01)
    *G06Q 50/00*     (2012.01)
    *G06F 16/9536*     (2019.01)
    *G06F 16/2457*     (2019.01)
    *G06F 16/901*     (2019.01)

(52) U.S. Cl.
    CPC ...... *G06F 16/9024* (2019.01); *G06F 16/9536* (2019.01); *G06Q 50/00* (2013.01); *G06Q 50/01* (2013.01)

(58) Field of Classification Search
    USPC .................... 707/737, 752, 770, 798
    See application file for complete search history.

(56) References Cited

U.S. PATENT DOCUMENTS

2013/0268595 A1* 10/2013 Mohan ............ H04L 12/185
                                            709/204
2017/0270254 A1* 9/2017 Guney ............ G16H 40/67

FOREIGN PATENT DOCUMENTS

CN     105677648 A     6/2016
CN     105893382 A     8/2016

OTHER PUBLICATIONS

Communication dated Jul. 8, 2019 from the State Intellectual Property Office of the P.R.C. in application No. 201610954505.0.
International Search Report and Translation of Written Opinion, dated Dec. 28, 2017 from the International Bureau in counterpart International application No. PCT/CN2017/105956.
Xin, Nan, "The Research of Real-Time Community Detection Algorithm Based on Label Propagation", Electronic Technology & Information Science, China Master's Theses Full-text Database, Jan. 15, 2014, chapter 2, pp. 1-66 (73 pages).

* cited by examiner

FIG. 8

COMMUNITY DISCOVERY METHOD, DEVICE, SERVER AND COMPUTER STORAGE MEDIUM

CROSS-REFERENCE TO RELATED APPLICATIONS

This application is a U.S. national stage application under 35 U.S.C. § 371 of International Patent Application No. PCT/CN2017/105956 filed on Oct. 12, 2017, which claims priority from Chinese Patent Application No. 201610954505.0, filed in the Chinese Patent Office on Oct. 27, 2016, and Chinese Patent Application No. 201610933379.0, filed in the Chinese Patent Office on Oct. 31, 2016, the disclosures of which are incorporated herein by reference in their entireties.

BACKGROUND

Field

Methods and apparatuses consistent with example embodiments relate to computer technologies and Internet technologies, and in particular, to a community discovery method and apparatus, a server and a computer storage medium.

Description of Related Art

Community discovery relates to partitioning a social network into different communities, so that connections of user relationships inside a same community are close and connections of relationships between communities are sparse.

A related community discovery method includes: partitioning a social network into communities by a server according to a Scalable Community Detection (SCD) algorithm, and obtaining a plurality of communities. Examples of social network include Facebook, microblog, School VPN, and an instant messaging application program.

In the SCD algorithm, connections inside the communities obtained by a partition based on a triangle in the network are closed, and there is particular accuracy. However, because of an excessively fine partition into the communities, the SCD algorithm is not applicable to many scenarios. For example, if the social network is School VPN, a community obtained after a partition is usually as small as a department to which a user belongs to in an association. However, the user usually expects to partition School VPN based on student characteristics, such as middle school classmates, high school classmates and college classmates. Therefore, it is apparent that the foregoing partition method does not satisfy a requirement of the user.

SUMMARY

According to embodiments, there is provided a community discovery method, the method being performed by one or more processors, and the method including: partitioning nodes in a social network into community nodes partitioned into n first communities, each of the n first communities being associated with a corresponding community label, the corresponding label of each of the community nodes initially indicating a first community from among the n first communities to which the community node belongs, and n being an integer greater than or equal to 2; updating the corresponding label of each community node comprised in the n first communities; and partitioning the community nodes into m second communities, each of the community nodes in each of the m second communities having a same label, and m being a positive integer less than n.

According to embodiments, there is provided a community discovery apparatus including: at least one memory configured to store computer program code; and at least one processor configured to access the at least one memory and operate according to the computer program code, the computer program code including: partitioning code configured to cause the at least one processor to partition nodes in a social network into community nodes partitioned into n first communities, each of the n first communities being associated with a corresponding community label, the corresponding label of each of the community nodes initially indicating a first community from among the n first communities to which the community node belongs, and n being an integer greater than or equal to 2; update code configured to cause the at least one processor to update the corresponding label of each community node comprised in the n first communities; and merging code configured to cause the at least one processor to partition the community nodes into m second communities, each of the community nodes in each of the m second communities having a same label, and m being a positive integer less than n.

According embodiments, there is provided non-transitory computer-readable storage medium storing instructions that cause at least one processor to perform a community discovery method including: partitioning nodes in a social network into community nodes partitioned into n first communities, each of the n first communities being associated with a corresponding community label, the corresponding label of each of the community nodes initially indicating a first community from among the n first communities to which the community node belongs, and n being an integer greater than or equal to 2; updating the corresponding label of each community node comprised in the n first communities; and partitioning the community nodes into m second communities, each of the community nodes in each of the m second communities having a same label, and m being a positive integer less than n.

DETAILED DESCRIPTION

To make the objectives, technical solutions, and advantages of the present disclosure clearer, the following further describes implementations of the present disclosure in detail with reference to the accompanying drawings.

Figure 1:
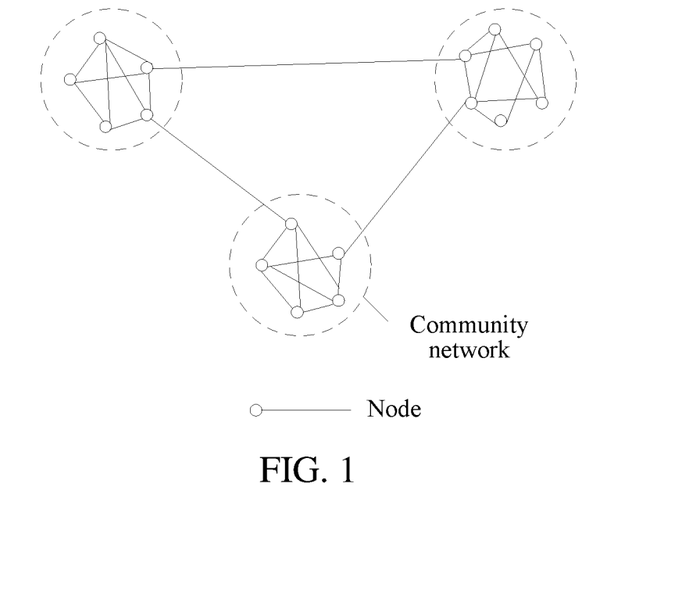
FIG. 1 is a schematic diagram of a social network according to embodiments.
Figure 2:
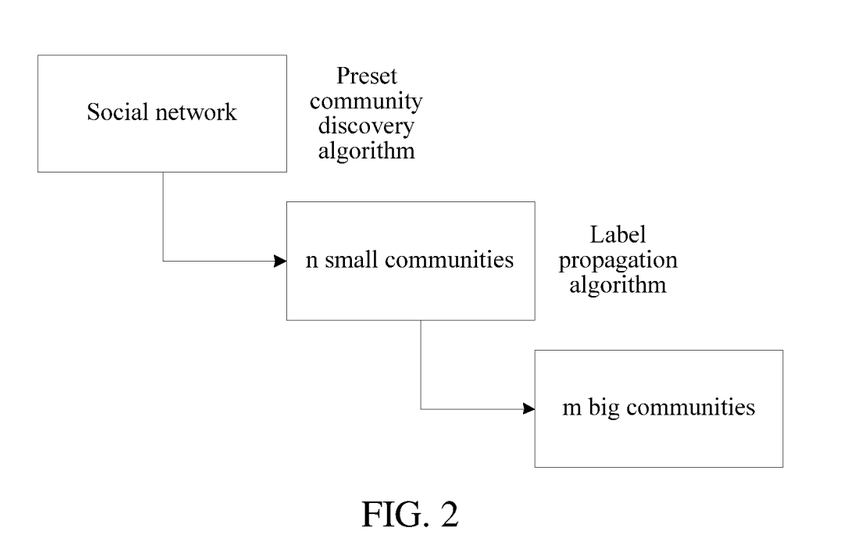
FIG. 2 is an architecture diagram of algorithms related in a community discovery method according to embodiments.

According to an embodiment, a community discovery method may be applied to a server. The server may be a server, or may be a server cluster including a plurality of servers. FIG. 1 is a schematic diagram of a social network according to embodiments. As shown in FIG. 1, the social network may be illustrated as a "diagram", with a network user represented by a node in the "diagram", and an association relationship between network users represented by a line between nodes. The server is configured to partition the social network into at least two communities whose accuracy is higher than a preset threshold, and merge first communities obtained by a partition into a second community by updating a label of a community node in each of the first communities, so that the obtained community has particular accuracy and partition granularity of the obtained community can still satisfy a community partition requirement. The foregoing social network refers to at least one of relationship networks such as Facebook, microblog, School VPN, and an instant messaging application program, and each node in the social network is each corresponding network user. The server may obtain n first communities in the social network by using a community discovery algorithm to partition the social network, and update a community node in each of the n first communities according to a label propagation algorithm, thereby obtaining m second communities. A schematic framework diagram of algorithms of a community discovery method according to embodiments is illustrated in FIG. 2.

Figure 3:
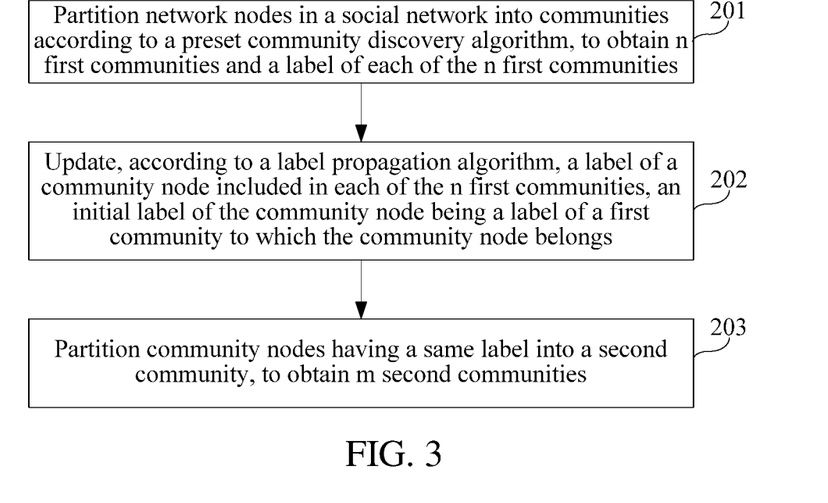
FIG. 3 is a flowchart of a community discovery method according to an embodiment.

FIG. 3 is a flowchart of a community discovery method according to an embodiment. The community discovery method may be applied to a server. The server includes one or more processors, a memory, and at least one program. The at least one program is stored in the memory, the program may include at least one module that is each corresponding to one set of instructions, and the one or more processors are configured to execute instructions. The steps of the community discovery method illustrated in FIG. 3 are described below in detail.

Step S201: Partition network nodes in a social network into communities, to obtain n first communities and a label of each of the n first communities, n being an integer greater than or equal to 2.

Herein, different community discovery algorithms have a particular error during community discovery, and are not completely accurate. That is, each community discovery algorithm has an accuracy. A community discovery algorithm selected by this embodiment is a community discovery algorithm whose community partition accuracy is higher than the preset threshold. A higher accuracy of community discovery of a community discovery algorithm generally results in a correspondingly smaller community obtained by a partition. Therefore, in the community discovery algorithm used in this embodiment, partition granularity of communities is usually smaller than a preset granularity. Using that granularity includes: classmates>college classmates>student union classmates>department classmates in a student union>group classmates in a department of the student union as an example, the preset granularity may be one thereof, for example, the student union. That is, the partition granularity of the communities may be, for example, any granularity larger than a smallest granularity and smaller than a largest granularity. Specifically, the preset community discovery algorithm may be, for example, any of an SCD algorithm and a clique percolation algorithm.

Each first community obtained by a partition includes at least one community node. In addition, a label of each community node in a first community is a label of the first community. The label of the first community may be college classmates, colleagues, families, and so on.

For example, the first communities obtained by a partition include A, B, C, and D, and labels of the first communities are A', B', C' and D'. The first community A includes community nodes A1, A2, A3, and A4, the first community B includes community nodes B1, B2, and B3, the first community C includes community nodes C1, C2, C3, C4, C5 and C6, and the first community D includes community nodes D1, and D2. An initial label of the community nodes A1, A2, A3, and A4 is A', an initial label of the community nodes B1, B2, and B3 is B', an initial label of the community nodes C1, C2, C3, C4, C5 and C6 is C', and an initial label of the community nodes D1, and D2 is D'. The foregoing only uses that each small community includes several community nodes as an example. However, embodiments are not limited thereto, and each small community may further include tens, hundreds or even thousands of community nodes.

Step S202: Update, according to a label propagation algorithm, a label of a community node included in each of the n first communities, the community node being a network node in the n first communities, and an initial label of the community node being a label of a first community to which the community node belongs.

As an implementation, the updating a label of a community node according to a label propagation algorithm includes: traversing each community node to acquire a first quantity, the first quantity being a quantity of community nodes in a first community to which the community node belongs; acquiring a quantity of neighboring community nodes that are neighboring to the community node and that are included in a small community to which each neighboring community node of the community node belongs, and selecting the largest value of the quantities of neighboring community nodes as a second quantity; and updating the label of the community node to a label of the first community corresponding to the second quantity, if the second quantity is greater than the first quantity, the first community corresponding to the second quantity representing a first community where the quantity of the neighboring community nodes that are neighboring to the community node is the second quantity.

Herein, for each community node, the server may acquire a first quantity based on a quantity of community nodes in a first community to which the community node belongs.

For example, using the community node A1 as an example, the server may acquire a quantity four of community nodes included in a community where A1 is located, namely, a first community A. For another example, the community node C2, the server may acquire a quantity five of community nodes in a community where C2 is located, namely, a first community C.

Herein, in the social network, a neighboring relationship possibly exists between different community nodes. For each community node, the server may first collect a quantity of neighboring community nodes that are neighboring to the community node and that are included in a candidate community, and then select the largest value of the quantities of neighboring community nodes as a second quantity. The candidate community refers to a first community to which each neighboring community node of the community node belongs.

For example, still using the community node A1 as an example, the community node A1 is neighboring to the community node C1, and the server may acquire a quantity such as five (which are respectively C1, C2, C3, C4 and C5)

of neighboring nodes of A1 included in a community where C1 is located, namely, a first community C.

In this embodiment, for the traversing each community node to acquire a first quantity, and the acquiring a quantity of neighboring community nodes that are neighboring to the community node and that are included in a first community to which each neighboring community node of the community node belongs, and selecting the largest value of the quantities of neighboring community nodes as a second quantity, a performing process may not be limited. The first quantity may be obtained first and then the second quantity is obtained, or the second quantity may be obtained first and then the first quantity is obtained, or the first quantity and the second quantity are obtained at the same time.

In this embodiment, after the sever acquires the first quantity and the second quantity, the server may detect whether the second quantity is greater than the first quantity. If a detection result is that the second quantity is greater than the first quantity, a large part of neighboring community nodes of the community node are in a candidate community corresponding to the second quantity. In this case, the community node is more likely to be partitioned in to the candidate community. Therefore, to merge communities, the server may update a label of the community node to a label of the candidate community corresponding to the second quantity.

For example, still using the community node A1 as an example, the first quantity acquired by the server is four, the second quantity is five, and the second quantity is greater than the first quantity. In this case, the server may update a label of A1 from A' to the label C' of the first community C.

It should be noted that if the second quantity is not greater than the first quantity, the server does not perform any processing on the label of the community node. For example, the acquired second quantity is two, the server does not update the label of the community node A1. That is, the label of the community node A1 is still A'.

As an implementation, the community discovery method further includes: detecting whether a total quantity of community nodes that are in community nodes and whose labels change reaches a quantity threshold, after traversing each community node; traversing each community node again, if a detection result is that the total quantity of the community nodes whose labels change reaches the quantity threshold; and ending traversal, if the detection result is that the total quantity of the community nodes whose labels change does not reach the quantity threshold.

The server may count each time the label of the community node is updated, acquire a quantity of community nodes whose labels change, and detect whether the quantity reaches a quantity threshold, after traversing each community node. The quantity threshold is a value preset by a user, and the quantity threshold is less than a preset value. The quantity threshold may be, for example, 0.

If a detection result of the server is that the total quantity of the community nodes whose labels change reaches the quantity threshold, it shows that the label of each community node has not tended to be stable and still has space to continue to propagate. In this case, the server may traverse each community node, and determine whether there is a community node whose label needs to be updated. If the detection result is that the total quantity of the community nodes whose labels change does not reach the quantity threshold, it shows that the label of each community node has tended to be stable. In this case, the server may end an update of the label of the community node.

Step S203: Partition community nodes having a same label into a second community, to obtain m second communities, m being a positive integer less than n Herein, specifically, in response to the detection result that the total quantity of the community nodes whose labels change does not reach the quantity threshold, community nodes having a same label are partitioned into a second community, to obtain m second communities.

Each time the server updates a label of a community node, the server may partition the community node into a community corresponding to the updated label. Certainly, after traversing each community node, the server may further uniformly partition a community node having a same label as the label of the community node into a second community.

In an application scenario of this embodiment, using that the social network is School VPN and the preset community discovery algorithm is an SCD algorithm as an example, after the server obtains a first community by a partition based on a department of an association according to the SCD algorithm, for a user in a department, friends, namely, most of neighboring nodes, are in a community of a class. Therefore, the server may merge a user in the first community of the department into a second community of the class. Similarly, a user in a first community of the class may be merged into a second community of a school. In this way, the server can obtain a big community of an accurate partition and relatively large granularity.

As an implementation, before traversing each community node, community nodes may be sorted first. For example, the community nodes are sorted in random order, or the community nodes are sorted based on importance of the community nodes. When the community nodes are sorted based on importance, the community nodes are sorted based on importance of each community node. Correspondingly, the traversing each community node to acquire a first quantity includes: acquiring a first quantity of each community node in order of the community nodes after being sorted.

Sorting the community nodes based on importance of each community node may include specifically the following three possible implementations.

First, N community nodes may be sorted in descending order of clustering coefficients of the community nodes.

Specifically, a clustering coefficients of a community node is $$CC(i) = \frac{2j}{k(k-1)}.$$

j represents a quantity of edges that are connected to each other and that are between all neighboring community nodes of an ith community node, and k represents a quantity of all neighboring community nodes of the ith community node.

During sorting, if clustering coefficients of a plurality of community nodes are the same, for the plurality of community nodes, the server sorts in descending order of degrees of the community nodes. A degree of a node represents a quantity of neighboring community nodes neighboring to a community node. For example, using the community node A1 as an example, community nodes neighboring to the community node A1 includes C1, C2, C3, C4, and C5, and a degree of the community node A1 is five. In addition, when clustering coefficients of community nodes is 1 and degrees are less than a preset degree, the community nodes are ranked at the bottom, and the community nodes are sorted in descending order of degrees.

Second, the community nodes may be sorted according to a Pagerank algorithm.

Third, the community nodes may be sorted in descending order of degrees of the community nodes.

Embodiments are not limited thereto, and the server may further sort the community nodes by using another method.

In addition, this embodiment only uses updating a label of a community node by using the foregoing label propagation algorithm as an example. The server may further update a label of a community node by using another label propagation algorithm. Details are not described in this embodiment.

It should be noted that the first community described in this embodiment refers to a community obtained by a partition by using a preset community discovery algorithm, the second community refers to a community obtained by repartitioning based on a same label after updating a label of a node in a small community according to a label propagation algorithm. This does not mean a quantity of community nodes included in the second community is necessarily greater than a quantity of community nodes included in the first community. That is, a quantity of community nodes included in a second big community in the m second communities is possibly less than a quantity of community nodes included in a first community in the n first communities.

In conclusion, in the community discovery method provided in this embodiment, after n first communities are obtained by a partition, a label of a community node in each of the n first communities is updated according to a label propagation algorithm, thereby partitioning community nodes having a same label into a second community, to obtain m second communities; that is, first communities obtained by preliminarily partitioning are merged, thereby obtaining less second communities. This resolves a problem that granularity of communities obtained by a partition in the existing technology is relatively small, and further cannot satisfy requirements of some scenarios; and this achieves an effect of ensuring accuracy of the communities obtained by a partition, and merging first communities into a second community to enable granularity of obtained communities to satisfy a partition requirement.

In addition, in this embodiment, when label propagation is performed, the label of the community node is updated to the label of the candidate community corresponding to the second quantity only when the second quantity is greater than the first quantity, ensuring community partition accuracy after repartition of communities based on the updated label. The label of the community node is updated to the label of the candidate community corresponding to the second quantity greater than the first quantity, avoiding a problem that randomness exists when an existing label propagates, and reducing fluctuation of the partitioned communities.

In addition, during updating the label, when traversing each community node, c sorted in descending order of importance of the community nodes may be traversed, and further ensures accuracy of merged communities.

Figure 4:
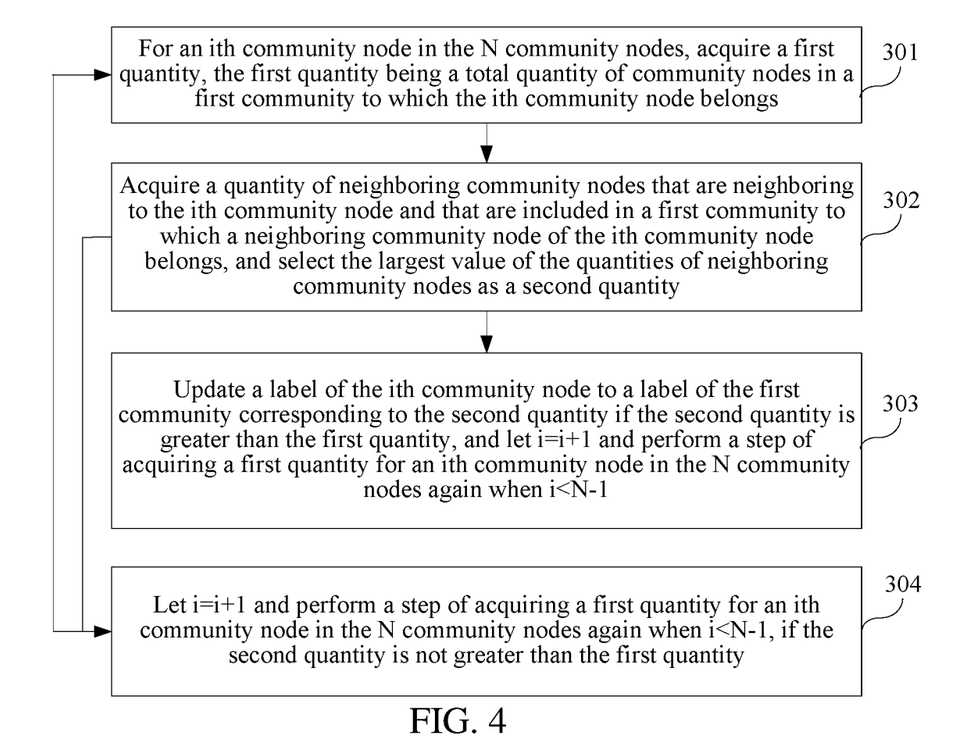
FIG. 4 is a flowchart of updating a label of a community node according to an embodiment.

In the foregoing embodiment, a total quantity of the community nodes is assumed to be N. Referring to FIG. 4, a traversing process may be specifically implemented as the following steps.

Step S301: For an ith community node in the N community nodes, acquire a first quantity, the first quantity being a total quantity of community nodes in a first community to which the ith community node belongs, $0 \leq i \leq N-1$, i being a positive integer, and an initial value of i being 0.

Step S302: Acquire a quantity of neighboring community nodes that are neighboring to the ith community node and that are included in a first community to which a neighboring community node of the ith community node belongs, and select the largest value of the quantities of neighboring community nodes as a second quantity.

Step S303: Update a label of the ith community node to a label of the first community corresponding to the second quantity if the second quantity is greater than the first quantity, and let $i=i+1$ and perform a step of acquiring a first quantity for an ith community node in the N community nodes again when $i<N-1$.

After the label of the ith community node is updated, to traverse next community node in the N community nodes, the server may perform step S301 again when $i<N-1$ and let $i=i+1$. Details are not described herein again.

If $i=N-1$ after the label of the ith community node is updated, it shows that the N community nodes are completely traversed. In this case, the server may detect whether a total quantity of community nodes that are in community nodes and whose labels change reaches a quantity threshold.

Step S304: Let $i=i+1$ and perform a step of acquiring a first quantity for an ith community node in the N community nodes again when $i<N-1$, if the second quantity is not greater than the first quantity.

If the second quantity is not greater than the first quantity, because the label of the ith community node does not need to be updated in this case, to traverse next community node in the N community nodes, the server may let $i=i+1$ and perform step S301 again when $i<N-1$ in this case. Details are not described herein.

Similar to step S303, if $i=N-1$, the server may detect whether a total quantity of community nodes that are in community nodes and whose labels change reaches a quantity threshold.

The community discovery algorithm in the foregoing embodiment may be at least one of an SCD algorithm and a clique percolation algorithm. The following uses that the community discovery algorithm is an SCD algorithm as an example, and step S201 may include:

First, community initialization.

WCC (Weighted Community Clustering) is a community partition evaluation index based on a triangle. WCC may be obtained by derivation of the following formula (1):

$$WCC(x, C) = \begin{cases} \frac{t(x, C)}{t(x, V)} * \frac{vt(x, V)}{|C\setminus\{x\}| + vt(x, V\setminus C)}, & \text{if} t(x, V) \neq 0 \\ 0, & \text{if} t(x, v) \neq 0 \end{cases} \quad (1)$$

The formula (1) is used for calculating a WCC value of a node x related to a community C. t(x, C) represents a quantity of triangles that are related to the node x and that are in the community C, and vt(x, C) represents a quantity of all nodes that belong to the community C and that can form a triangle with the node x. $|C\setminus\{x\}|+vt(x,V\setminus C)$ represents another node in the community C except x.

A WCC value of a single community may be represented by using a formula (2):

$$WCC(C) = \frac{1}{|C|}\sum_{x \in C} WCC(x, C). \quad (2)$$

A total WCC value partitioned into a community may be represented by using a formula (3):

$$WCC(P) = \frac{1}{|V|} \sum_{i=1}^{n} (|C_i| * WCC(C_i)). \quad (3)$$

$P=\{C_1, C_2, \ldots C_n\}$, and V represents a node in a network. A greater WCC value represents a better partition effect.

Second, the SCD algorithm uses the WCC value of the formula (3) as a target function, and optimizes the WCC value by using a greedy algorithm, to obtain a partial optimal partition. SCD mainly includes two steps:

1. Precluster.

Before preclustering, pruning needs to be performed on communities. The SCD algorithm first removes an edge that does not belong to any triangle and that is in the network. a clustering coefficient of each node is calculated, and a clustering coefficient of a node v satisfies the following formula (4):

$$CC(v) = \frac{2j}{k(k-1)}. \quad (4)$$

j represents a quantity of edges that are connected to each other and that are between all neighboring community nodes of the node v, and k represents a quantity of all neighboring community nodes of the node v.

Nodes are sorted in reverse order based on the clustering coefficient of each node. If clustering coefficients are the same, the nodes are sorted in descending order based on degrees of the nodes. There is a special situation. When a clustering coefficient of a node is one and a degree of the node is two, the node is sorted at an end of a sequence, and a node sequence S is finally obtained.

Preclustering starts. Each node in the node sequence S is traversed in order. For any node v that has not been accessed, a new community C is created for the node v and a neighboring node thereof that has not been accessed. Nodes in the community C is marked as accessed, and the community C is added to a partition P. An iteration ends till all nodes are marked as accessed, and a partition P of preclustering is obtained.

2. Refine Clustering.

Figure 5:
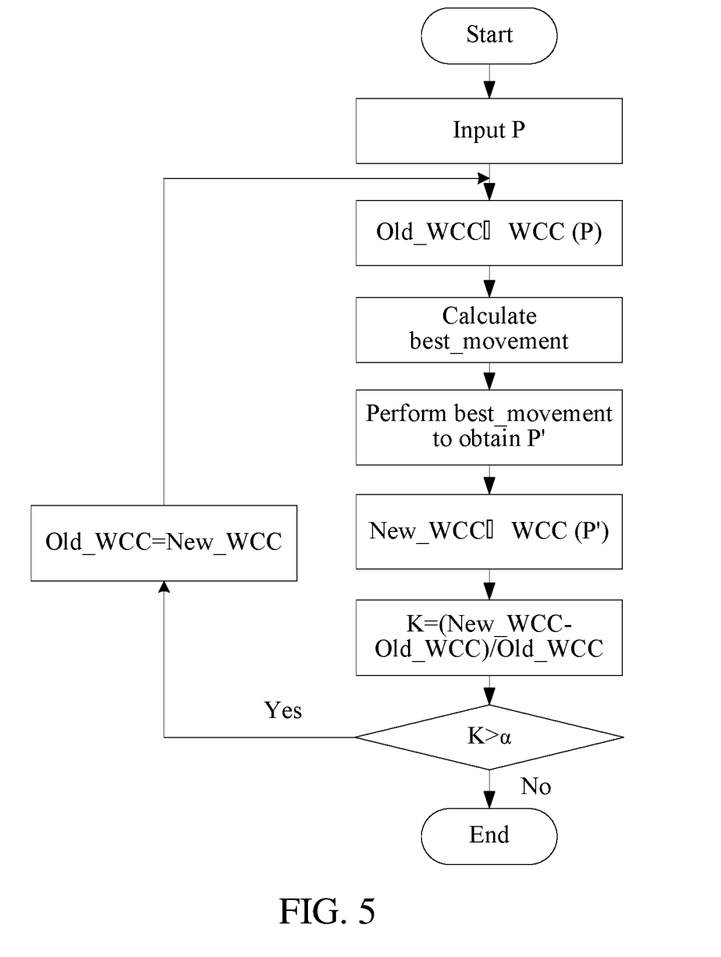
FIG. 5 is a flowchart of a community discovery method according to another embodiment.

After the partition P is obtained during preclustering, the WCC value is optimized by using a hill climbing method. First each node is traversed, and best_movement of each node is calculated. Then best_movement is performed on each node to obtain a new partition P'. A new WCC value of P' is calculated. If an improvement of the new WCC value relative to the WCC value of the old partition P is greater than a threshold α (α may be, for example, 0.1), best_movement of the new partition P' is recalculated, and ends till an improvement between WCC values of two partitions is less than the threshold α. Referring to FIG. 5, FIG. 5 is a specific method flowchart.

best_movement represents an optimal operating manner for each node. During actual application, there are three candidate operating manners: No_Action, Remove, and Transfer. No_Action represents perform no operation; Remove represents remove a node from a current community, to enable the node to be an isolated node; and Transfer represents move a node from a current community to another community.

Specifically, before the server calculates best_movement, a gain of each operation to the WCC value is first calculated, specifically including:

A. $WCC_I(v,C_1)$ represents an improvement situation of a total WCC value after an isolated node v is inserted into a community $C_1$. $P=\{C_1, C_2, \ldots C_k, \{v\}\}$ and $P'=\{C'_1, C_2, \ldots C_k\}$ are both assumed to be partitions of a figure G(V, E), and $C'_1 = C_1 \cup \{v\}$:

$$WCC(P') - WCC(P) = WCC_I(v, C_1) = \quad (5)$$
$$\frac{1}{|V|} * \sum_{x \in C_1} [WCC(x, C'_1) - WCC(x, C_1)] + \frac{1}{|V|} * WCC(v, C'_1).$$

B. $WCC_R(v,C_1)$ represents an improvement situation of a total WCC value after a node v is removed from a community $C_1$. $P=\{C_1, C_2, \ldots C_k\}$ and $P'=C'_1, C_2, \ldots C_k, \{v\}$ are both assumed to be partitions of a figure G(V, E), and $C_1 = C'_1 \cup \{v\}$:

$$WCC(P') - WCC(P) = WCC_R(v,C_1) = -WCC_I(v,C'_1) \quad (6).$$

C. $WCC_T(v,C_1,C_2)$ represents an improvement situation of a total WCC value after a node v is removed from a community C1 to a community C2. $P=\{C_1, C_2, \ldots C_k\}$ and $P'=\{C'_1, C_2, \ldots C'_k\}$ are both assumed to be partitions of a figure G(V, E), and $C_1 = C'_1 \cup \{v\}$ and $C'_k = C_k \cup \{v\}$:

$$WCC(P') - WCC(P) = WCC_T(v,C_1,C_k) = -WCC_I(v,C'_1) + WCC_I(v,C_k) \quad (7).$$

For each node v in V, the server first calculate an improvement $WCC_R(v,C_1)$ after removing the node v from a current community, then obtains a potential candidate community of the node v from a community where a neighbor of the node v is located, calculates a transferring improvement value $WCC_T(v,C_1,C_2)$ corresponding to each candidate community, and selects the largest improvement value of the transferring improvement values $WCC_T(v,C_1,C_2)$ and marks the value. Then an optimal operation is selected from $WCC_R(v,C_1)$ and a largest $WCC_T(v,C_1,C_2)$, that is, Remove or Transfer. If both improvements to the WCC value are negative, v remains unchanged in an original community (No_Action).

After the forgoing steps, the server can obtain a plurality of small communities by a partition. Then, the server may allocate a corresponding label to each community.

Figure 6:
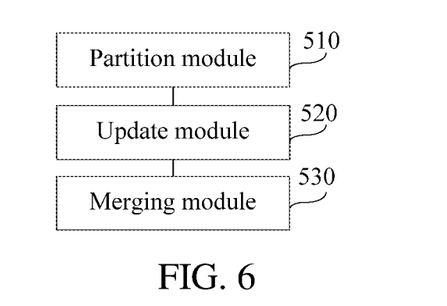
FIG. 6 is a schematic structural diagram of a community discovery apparatus according to another embodiment.

Referring to FIG. 6, FIG. 6 is a schematic structural diagram of a community discovery apparatus according to an embodiment. The community discovery apparatus may be applied to a server. The server includes one or more processors, a memory, and at least one program. The at least one program is stored in the memory, the program may include at least one module that is each corresponding to one set of instructions, and the one or more processors are configured to execute instructions. Referring to FIG. 6, the community discovery apparatus may include: a partition module 510, an update module 520, and a merging module 530, where the partition module 510 is configured to partition network nodes in a social network into communities, to obtain n first communities and a label of each of the n first communities, n being an integer greater than or equal to 2;

the update module 520 is configured to update, according to a label propagation algorithm, a label of a community node included in each of the n first communities, the community node being a network node in the n first communities, and an initial label of the community node being a label of a first community to which the community node belongs; and the merging module 530 is configured to partition community nodes having a same label into a second community, to obtain m second communities, m being a positive integer less than n.

In conclusion, in the community discovery apparatus provided in this embodiment, after n first communities are obtained by a partition, a label of a community node in each of the n first communities is updated according to a label propagation algorithm, thereby partitioning community nodes having a same label into a second community, to obtain m second communities; that is, first communities obtained by preliminarily partitioning are merged, thereby obtaining less second communities. This resolves a problem that granularity of communities obtained by a partition in the existing technology is relatively small, and further cannot satisfy requirements of some scenarios; and this achieves an effect of ensuring accuracy of the communities obtained by a partition, and merging first communities into a second community to enable granularity of obtained communities to satisfy a partition requirement.

Based on the community discovery apparatus provided in the foregoing embodiment, as an implementation, the update module 520 includes:

a first acquiring unit, configured to traverse each community node to acquire a first quantity, the first quantity being a quantity of community nodes in a first community to which the community node belongs;

a second acquiring unit, configured to acquire a quantity of neighboring community nodes that are neighboring to the community node and that are included in a first community to which each neighboring community node of the community node belongs, and select the largest value of the quantities of neighboring community nodes as a second quantity; and an update unit, configured to update the label of the community node to a label of the first community corresponding to the second quantity, when the second quantity acquired by the second acquiring unit is greater than the first quantity acquired by the first acquiring unit, the first community corresponding to the second quantity representing a first community where the quantity of the neighboring community nodes that are neighboring to the community node is the second quantity.

As an implementation, the apparatus further includes:

a detection module, configured to detect whether a total quantity of community nodes that are in community nodes and whose labels change reaches a quantity threshold, after traversing each community node;

a first result module, configured to traverse each community node again, when a detection result of the detection module is that the total quantity of the community nodes whose labels change reaches the quantity threshold; and a second result module, configured to end traversal, when the detection result of the detection module is that the total quantity of the community nodes whose labels change does not reach the quantity threshold.

As an implementation, the apparatus further includes:

a sorting module, configured to sort the community nodes based on importance of each community node; and the first acquiring unit, further configured to acquire a first quantity of each community node in order of the community nodes after being sorted.

As an implementation, the sorting module is further configured to:

sort the community nodes in descending order of clustering coefficients of the community nodes; sort the community nodes according to a Pagerank algorithm; or sort the community nodes in descending order of degrees of the community nodes.

A person skilled in the art should understand that for functions of each processing unit in the community discovery apparatus of this embodiment, reference may be made to the related descriptions of the foregoing community discovery method for understanding. Each processing unit in the community discovery apparatus of this embodiment may be implemented by implementing an analog circuit of the functions according to this embodiment, or may be implemented by running of software of the functions according to this embodiment on an intelligent terminal.

It should be noted that the community discovery apparatus provided in the foregoing embodiment is illustrated with only an example of division of the foregoing function modules. In practical application, the foregoing functions may be distributed to different function modules according to requirements, that is, the internal structure of the server is divided into different function modules, so as to finish all or part of the functions described above. In addition, the community discovery apparatus provided in the foregoing embodiment and the embodiment of the community discovery method belong to one concept. For the specific implementation process, refer to the method embodiment, and details are not described herein again.

In this embodiment, the community discovery apparatus may be implemented by using a server; and the partition module 510, the update module 520, the merging module 530, the detection module, the first result module, the second result module and the sorting module may be implemented by using a central processing unit (CPU), a digital signal processor (DSP) or field-programmable gate array (FPGA).

An embodiment provides a computer storage medium, where the computer storage medium may be a computer readable storage medium included in the memory in the foregoing embodiment; or may exist alone, and is not assembled to a computer readable storage medium of a terminal. The computer readable storage medium stores at least one computer executable instruction. The at least one computer executable instructions is used by at least one processors for performing the community discovery method in this embodiment. Specifically, the computer executable instruction is used for performing: partitioning network nodes in a social network into communities according to a preset community discovery algorithm, to obtain n first communities and a label of each of the n first communities, n being an integer greater than or equal to 2; updating, according to a label propagation algorithm, a label of a community node included in each of the n first communities, the community node being a network node in the n first communities, and an initial label of the community node being a label of a first community to which the community node belongs; and partitioning community nodes having a same label into a second community, to obtain m second communities, m being a positive integer less than n.

As an implementation, the computer executable instruction is used for performing: traversing each community node to acquire a first quantity, the first quantity being a quantity of community nodes in a first community to which the community node belongs; acquiring a quantity of neighboring community nodes that are neighboring to the community node and that are included in a first community to which each neighboring community node of the community node belongs, and selecting the largest value of the quantities of neighboring community nodes as a second quantity; and updating the label of the community node to a label of the first community corresponding to the second quantity, if the second quantity is greater than the first quantity, the first community corresponding to the second quantity representing a first community where the quantity of the neighboring community nodes that are neighboring to the community node is the second quantity.

As an implementation, the computer executable instruction is used for performing: detecting whether a total quantity of community nodes that are in the community nodes and whose labels change reaches a quantity threshold, after traversing each community node; traversing each community node again, if a detection result is that the total quantity of the community nodes whose labels change reaches the quantity threshold; and ending traversal, if the detection result is that the total quantity of the community nodes whose labels change does not reach the quantity threshold.

As an implementation, the computer executable instruction is used for performing: sorting the community nodes based on importance of each community node; and acquiring a first quantity of each community node in order of the community nodes after being sorted.

As an implementation, the computer executable instruction is used for performing: sorting the community nodes in descending order of clustering coefficients of the community nodes; sorting the community nodes according to a Pagerank algorithm; or sorting the community nodes in descending order of degrees of the community nodes.

Figure 7:
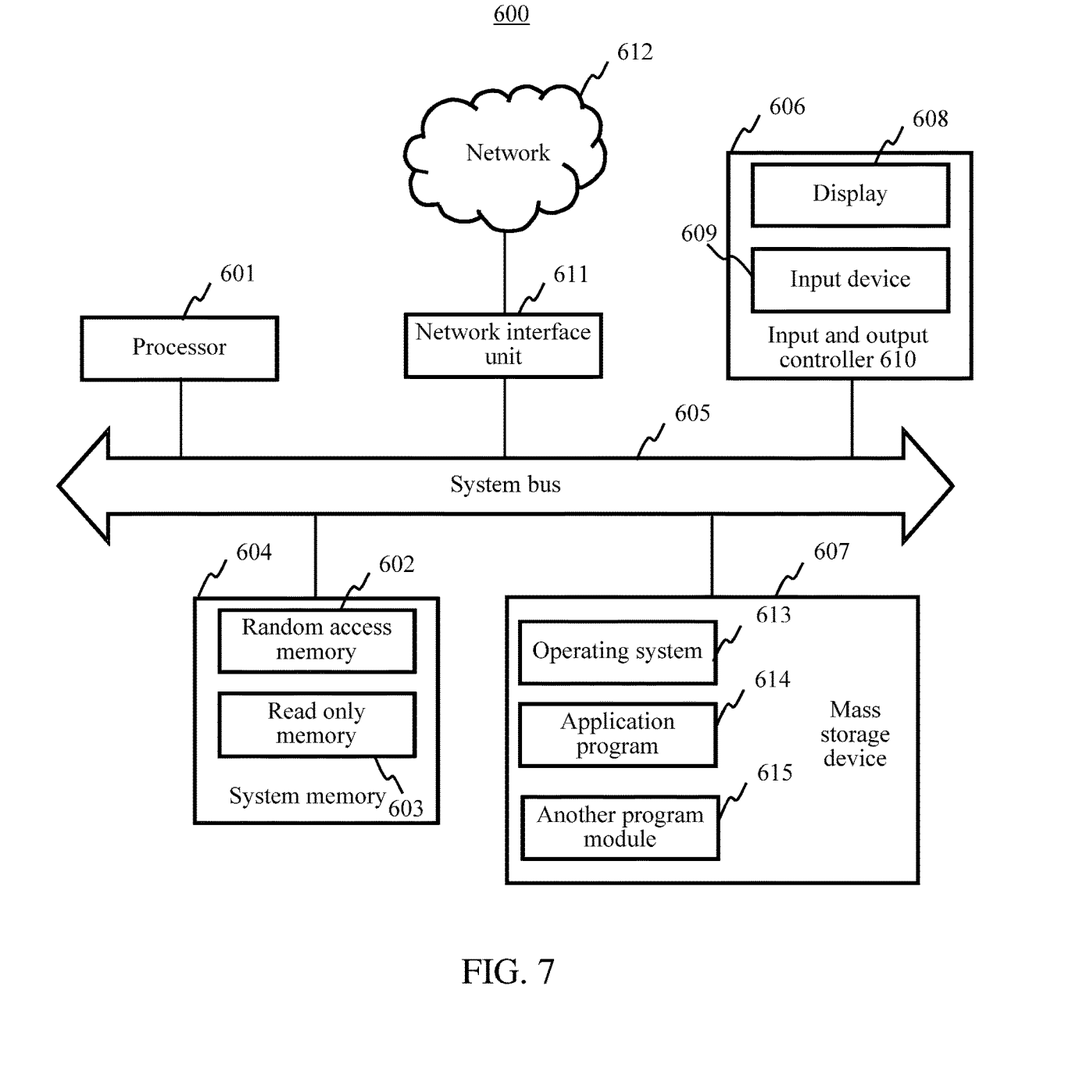
FIG. 7 is a schematic structural diagram of a server according to an embodiment.

Referring to FIG. 7, FIG. 7 shows a schematic structural diagram of a server according to an embodiment. The server is configured to implement the community discovery method provided in the foregoing embodiment. Specifically:

The server 600 includes a processor 601, a system memory 604 including a random access memory (RAM) 602 and a read only memory (ROM) 603, and a system bus 605 connecting the system memory 604 and the processor 601. The server 600 further includes a basic input/output system (I/O system) 606 used for transmitting information between components in a computer, and a mass storage device 607 used for storing an operating system 613, an application program 614, and another program module 615.

It may be understood that the processor 601 may be an integrated circuit chip and has a signal processing capability. In an implementation process, steps in the foregoing methods may be implemented through a hardware integrated logical circuit in the processor 601, or an instruction in the form of software. The processor 601 may be a general purpose processor, a DSP, another programmable logic component, a discrete gate, a transistor logic component, a discrete hardware component, or the like. The processor 601 may implement or execute methods, steps, and logical block diagrams disclosed in the embodiments. The general purpose processor may be a microprocessor, any conventional processor, or the like. The steps in the method disclosed in the embodiments may be directly implemented by a hardware decoding processor, or may be implemented by combining hardware and software modules in a decoding processor. The software module may be located in a storage medium, the storage medium is located in the system memory 604, and the processor 601 reads information in the system memory 604 and performs the steps of the foregoing method in combination with hardware of the processor 601.

The input/output system 606 includes a display 608 configured to display information and an input device 609 configured to input information by a user, for example, a mouse and a keyboard. The display 608 and the input device 609 are both connected to the processor 601 by using an input and output controller 610 connected to the system bus 605. The basic input/output system 606 may further include the input and output controller 610 to be configured to receive and process input from a plurality of other devices such as a keyboard, a mouse, or an electronic stylus. Similarly, the input and output controller 610 further provides output for a screen, a printer, or another type of output device.

The mass storage device 607 is connected to the processor 601 by using a mass storage controller (not shown) connected to the system bus 605. The mass storage device 607 and its associated computer readable medium provide non-volatile storage for the server 600. That is, the mass storage device 607 may include a computer readable medium (not shown) such as a hard disk or a CD-ROM drive.

Without loss of generality, the computer readable medium may include a computer storage medium and a communications medium. The computer storage medium includes volatile and non-volatile, removable and non-removable media implemented in any method or technology for storage of information such as a computer readable instruction, a data structure, a program module or other data. The computer storage medium includes a RAM, a ROM, an EPROM, an EEPROM, a flash memory or another solid state memory technology, a CD-ROM, a DVD or other optical storage, a cassette, a magnetic tape, a disk storage or other magnetic storage devices. Certainly, a person skilled in the art may learn that the computer storage medium is not limited to the foregoing ones. The system memory 604 and the mass storage device 607 may be collectively referred to as a memory.

According to various embodiments of the present disclosure, the server 600 may further be connected to a remote computer on a network through the network such as Internet to run. That is, the server 600 may be connected to a network 612 by using a network interface unit 611 connected to the system bus 605. In other words, the server 600 may use the network interface unit 611 to be connected to another type of network or a remote computer system (not shown).

The memory further includes at least one program, and the at least one program is stored in the memory, and is configured to be executed by at least one processor. The at least one program includes an instruction used for performing the foregoing community discovery method.

In this embodiment, the processor 601 is configured to perform, when executing the computer program: partitioning network nodes in a social network into communities according to a preset community discovery algorithm, to obtain n first communities and a label of each of the n first communities, n being an integer greater than or equal to 2; updating, according to a label propagation algorithm, a label of a community node included in each of the n first communities, the community node being a network node in the n first communities, and an initial label of the community node being a label of a first community to which the community node belongs; and partitioning community nodes having a same label into a second community, to obtain m second communities, m being a positive integer less than n.

As an implementation, the processor 601 is configured to perform, when executing the computer program: traversing each community node to acquire a first quantity, the first quantity being a quantity of community nodes in a first community to which the community node belongs; acquiring a quantity of neighboring community nodes that are neighboring to the community node and that are included in a first community to which each neighboring community node of the community node belongs, and selecting the largest value of the quantities of neighboring community nodes as a second quantity; and updating the label of the community node to a label of the first community corresponding to the second quantity, if the second quantity is greater than the first quantity, the first community corresponding to the second quantity representing a first community where the quantity of the neighboring community nodes that are neighboring to the community node is the second quantity.

As an implementation, the processor 601 is configured to perform, when executing the computer program: detecting whether a total quantity of community nodes that are in the community nodes and whose labels change reaches a quantity threshold, after traversing each community node; traversing each community node again, if a detection result is that the total quantity of the community nodes whose labels change reaches the quantity threshold; and ending traversal, if the detection result is that the total quantity of the community nodes whose labels change does not reach the quantity threshold.

As an implementation, the processor 601 is configured to perform, when executing the computer program: sorting the community nodes based on importance of each community node; and acquiring a first quantity of each community node in order of the community nodes after being sorted.

As an implementation, the processor 601 is configured to perform, when executing the computer program: sorting the community nodes in descending order of clustering coefficients of the community nodes; sorting the community nodes according to a Pagerank algorithm; or sorting the community nodes in descending order of degrees of the community nodes.

In the foregoing embodiments of this embodiment, the network node in the social network may be referred to as a node for short, the obtained first community and second community may be respectively referred to as a first social network model and a second social network model, and a method for generating the second community may further be implemented based on the following processing methods:

A first operation includes acquiring a first social network model representing that there is a first association relationship between nodes.

Herein, two nodes in the first social network model that have an edge have the first association relationship, and a friendship is between two users having the first association relationship.

A second operation includes expressing the first social network model as a first adjacency matrix according to a preset expression method.

Specifically, each node in the first social network model is traversed, element values corresponding to any two nodes having a direct association relationship are set to one, element values corresponding to any two nodes not having a direct association relationship are set to zero, and a first adjacency matrix is generated.

Herein, there are N nodes in the first social network model, the first adjacency matrix is an N*N matrix, and the first adjacency matrix is a symmetric matrix.

The first adjacency matrix represents that there is a direct association relationship between nodes in the first social network model, and the direct association relationship means that there is an edge between two nodes. For example, if there is an edge between a node 1 and a node 2 in the first social network model, there is a direct association relationship between the node 1 and the node 2, and a value of an element A12 in the first adjacency matrix is one. If there is not an edge between a node 1 and a node 3 in the first social network model, there is not a direct association relationship between the node 1 and the node 3, and a value of an element A13 in the first adjacency matrix is zero.

A third operation includes marking any two nodes in the first social network model that respectively have a direct association relationship with a first node as having a direct association relationship, to generate a second adjacency matrix, the first node being any node in the first social network model.

Herein, the first node is any node in the first social network model.

For example, if there is an edge between the node 1 and the node 2 in the first social network model, there is an edge between the node 2 and the node 3, there is not an edge between the node 1 and the node 3, and the node 1 and the node 3 are recorded to have a direct association relationship in the second adjacency matrix.

A fourth operation includes acquiring structural similarity, of any two nodes in the second adjacency matrix that have a direct association relationship, in the first adjacency matrix.

Specifically, a node u and a node v in the second adjacency matrix that have a direct association relationship are acquired, and a first neighboring node set corresponding to the node u and including the node u and a second neighboring node set corresponding to the node v and including the node v are respectively determined based on the first social network model represented by the first adjacency matrix.

A first node quantity of the first neighboring node set and a second node quantity of the second neighboring node set are respectively determined, and the structural similarity is determined based on the first neighboring node set, the second neighboring node set, the first node quantity and the second node quantity.

Herein, the structural similarity of the node u and the node v may be calculated by using the following formula:

$$Ts = \sigma(u, v) = \frac{|N[u] \cap N[v]|}{\sqrt{d[u] \cdot d[v]}}. \qquad (8)$$

Ts represent the structural similarity, N[u] represents a set of all adjacent nodes of the node u in a first matrix that include the node u, N[v] represents a set of all adjacent nodes of the node v in the first matrix that include the node v, |N[u]∩N[v]| represents a quantity of sets of N[u] and N[v], d[u] represents a node quantity of the set N[u], and d[v] represents a node quantity of the set N[v].

A fifth operation includes acquiring similarity of feature attributes of any two nodes in the second adjacency matrix that have a direct association relationship.

Specifically, similarity of a plurality of feature attributes of any two nodes in the second adjacency matrix that have a direct association relationship is acquired; similarity of feature attributes of the any two nodes is acquired after the similarity of the plurality of feature attributes is processed according to a linear weighted average algorithm; and when the similarity of the feature attributes is calculated, a weighting parameter may be flexibly set according to an actual requirement.

When similarity of feature attributes of any two nodes in the second adjacency matrix that have a direct association relationship is acquired, a first row vector and a second row vector, corresponding to a first feature attribute, of any two nodes in the second adjacency matrix that have a direct association relationship are respectively acquired. The first feature attribute is any feature attribute in the plurality of feature attributes. Values of the first row vector and the second row vector respectively represent states of the first feature attribute of any two nodes in a plurality of specified time periods in a preset time range. A first similarity, corresponding to the first feature attribute, of the any two nodes is determined based on the first row vector and the second row vector.

Herein, similarity of feature attributes of two nodes in the second adjacency matrix that have a direct association relationship may be calculated by using the following formula:

$$Ps = Sim(A, B) = \sum_{i=1}^{n}(a_i + b_i)\log\frac{a_i + b_i}{\sum_{i=1}^{n}a_i + \sum_{i=1}^{n}b_i} - \sum_{i=1}^{n}a_i\log\frac{a_i}{\sum_{i=1}^{n}a_1} - \sum_{i=1}^{n}b_i\log\frac{b_i}{\sum_{i=1}^{n}b_i}. \qquad (9)$$

Each feature attribute of nodes in the second adjacency matrix has a corresponding row vector value. For example whether to subscribe an official account or not is recorded as that row vector values corresponding to a corresponding feature attribute are one and zero, and times of posting a status or signing in in a single month at different geographic positions are recorded as that a row vector value corresponding to a corresponding feature attribute is a value of actual times or a value of a value of actual times after classification statistics according to a preset rule.

A and B are row vectors for a same feature of two nodes in a second adjacency matrix that have a direct association relationship, A=[a1, a2, . . . an], B=[b1, b2, . . . bn], an and bn respectively represent values of the two nodes on the feature, and $$\log(x) = \begin{cases} 0, & x = 0 \\ \log_2(x), & x > 0 \end{cases}.$$

The feature attribute includes: geographic position information, personal interests, behavior preference, and the like. When a plurality of feature attributes is processed according to a weighted average algorithm, weighted processing may be performed on similarity of the feature attributes according to an actual requirement to obtain similarity of feature attributes of a user A and a user B.

A sixth operation includes determining fusion similarity based on the structural similarity of the any two nodes and the similarity of the feature attributes, screening the determined fusion similarities according to a preset requirement, and generating a third adjacency matrix based on fusion similarity satisfying the preset requirement.

Specifically, fusion similarity of any two nodes is first calculated according to a form of a nonlinear index in the following formula:

$$TP_S = T_S^{\alpha + \beta \cdot Ps} \qquad (10).$$

$TP_S$ represents the fusion similarity, $P_S$ represents the similarity of the feature attributes, $T_S$ represents the structural similarity, $\alpha$ and $\beta$ are weighting parameters. and values of $\alpha$ and $\beta$ may be adjusted according to an actual requirement.

Then element values corresponding to the any two nodes in the second adjacency matrix that have a direct association relationship are replaced with the corresponding fusion similarity.

Finally, when fusion similarity between two nodes is less than a preset threshold, association between the two nodes may be thought to be weak. Therefore, all fusion similarity less than the preset threshold is replaced with zero to generate a third adjacency matrix.

Herein, the third adjacency matrix includes similarity of friendship chains of users, and includes similarity of feature attributes of the users, so that a result obtained by performing corresponding community discovery, link prediction and figure representation based on a reconstructed social network model has more practical significance.

A seventh operation includes generating, based on the third adjacency matrix, a second social network model representing a second association relationship between nodes.

Specifically, two nodes in the third adjacency matrix that have a second association relationship have an edge in the second social network model, and two nodes in the third adjacency matrix that do not have a second association relationship do not have an edge in the second social network model.

A detailed processing procedure of the foregoing processing process includes the following operations:

A first operation includes acquiring a first adjacency matrix used for representing a network model.

Specifically, each node in the first social network model is traversed, element values corresponding to any two nodes having a direct association relationship are set to one, element values corresponding to any two nodes not having a direct association relationship are set to zero, and a first adjacency matrix A is generated.

Figure 8:
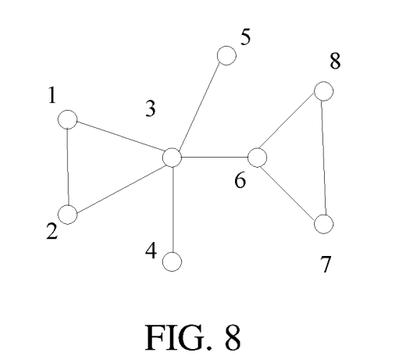
FIG. 8 is a schematic diagram of a social network model according to embodiments.

As shown in FIG. 8, if there is an edge between a node 1 and a node 2, there is a direct association relationship between the node 1 and the node 2, and a value of an element A12 in the first adjacency matrix is one; if there is not an edge between a node 1 and a node 6, there is not a direct association relationship between the node 1 and the node 6, and a value of an element A16 in the first adjacency matrix A is one; similarly, a value of each element in the first adjacency matrix A may be calculated; and $$A = \begin{bmatrix} 0 & 1 & 1 & 0 & 0 & 0 & 0 & 0 \\ 1 & 0 & 1 & 0 & 0 & 0 & 0 & 0 \\ 1 & 1 & 0 & 1 & 1 & 1 & 0 & 0 \\ 0 & 0 & 1 & 0 & 0 & 0 & 0 & 0 \\ 0 & 0 & 1 & 0 & 0 & 0 & 0 & 0 \\ 0 & 0 & 1 & 0 & 0 & 0 & 1 & 1 \\ 0 & 0 & 0 & 0 & 0 & 1 & 0 & 1 \\ 0 & 0 & 0 & 0 & 0 & 1 & 1 & 0 \end{bmatrix}.$$

A second operating includes marking two nodes that are in the first social network model and whose largest hop count is two as having a direct association relationship to generate a second adjacency matrix.

Specifically, as show in FIG. 8, a node 3 respectively has an edge with the node 1 and a node 5, the node 1 and the node 5 do not have an edge, a hop count between the node 1 and the node 5 is thought to be two, the node 1 and the node 5 are recorded to have a direct association relationship, and a value of an element A15 in the second adjacency matrix is one; similarly, values of elements A14 and A16 in the second adjacency matrix are both one; hop counts between the node 2, the node 3 and the node 1 are one, and values of elements A12 and A13 in the second adjacency matrix are both one; by such analogy, a second adjacency matrix A1 is obtained, and $$A1 = \begin{bmatrix} 0 & 1 & 1 & 1 & 1 & 1 & 0 & 0 \\ 1 & 0 & 1 & 1 & 1 & 1 & 0 & 0 \\ 1 & 1 & 0 & 1 & 1 & 1 & 1 & 1 \\ 1 & 1 & 1 & 0 & 1 & 1 & 0 & 0 \\ 1 & 1 & 1 & 1 & 0 & 1 & 0 & 0 \\ 1 & 1 & 1 & 1 & 1 & 0 & 1 & 1 \\ 0 & 0 & 1 & 0 & 0 & 1 & 0 & 1 \\ 0 & 0 & 1 & 0 & 0 & 1 & 1 & 0 \end{bmatrix}.$$

A third operation includes acquiring structural similarity, of any two nodes in the second adjacency matrix that have a direct association relationship, in the first adjacency matrix.

Specifically, using calculating structural similarity of the node 1 and the node 5 in the second adjacency matrix as an example, neighbors of the node 1 are the node 2 and the node 3 in the first adjacency matrix, a neighbor of the node 5 is the node 3, a set of neighbors of the node 1 and the node 5 are the node 3, and structural similarity of the node 1 and the node 5 is:

$$Ts = \sigma(1, 5) = \frac{|N[1] \cap N[5]|}{\sqrt{d[1] \cdot d[5]}} = \frac{1}{\sqrt{3*2}} = \frac{1}{\sqrt{6}}.$$

A fourth operation includes acquiring similarity of feature attributes of any two nodes in the second adjacency matrix that have a direct association relationship.

Specifically, similarity of a plurality of feature attributes of any two nodes in the second adjacency matrix that have a direct association relationship is first acquired; similarity of feature attributes of the any two nodes is then acquired after the similarity of the plurality of feature attributes is processed according to a linear weighted average algorithm; and when the similarity of the feature attributes is calculated, a weighting parameter may be flexibly set according to an actual requirement.

Using the node 1 and the node 5 in the network model shown in FIG. 8 as an example, row vectors of a first feature attribute in the node 1 and the node 5 are acquired, and similarity of the node 1 and the node 5 based on the first feature attribute is calculated by using the following formula:

$$Ps = Sim(A, B) = \tag{9}$$
$$\sum_{i=1}^{n}(a_i+b_i)\log\frac{a_i+b_i}{\sum_{i=1}^{n}a_i+\sum_{i=1}^{n}b_i} - \sum_{i=1}^{n}a_i\log\frac{a_i}{\sum_{i=1}^{n}a_1} - \sum_{i=1}^{n}b_i\log\frac{b_i}{\sum_{i=1}^{n}b_i},$$

where each feature attribute of nodes in the second adjacency matrix has a corresponding row vector value. For example whether to subscribe an official account or not is recorded as that row vector values corresponding to a corresponding feature attribute are one and zero, and times of posting a status or signing in in a single month at different geographic positions are recorded as that a row vector value corresponding to a corresponding feature attribute is a value of actual times or a value of a value of actual times after classification statistics according to a preset rule; and A and B are row vectors for a same feature of the node 1 and the node 5 in a second adjacency matrix, A=[a1, a2, . . . an], B=[b1, b2, . . . bn], an and bn respectively represent values of the node 1 and the node 5 on the feature, and $$\log(x) = \begin{cases} 0, & x=0 \\ \log_2(x), & x>0 \end{cases};$$

then, similarity of feature attributes of the node 1 and the node 5 are respectively calculated based on a same method; and finally, weighted processing may be performed on similarity of the feature attributes according to an actual requirement to obtain similarity of feature attributes of the node 1 and the node 5.

By using a same method as calculating the similarity of the feature attributes of the node 1 and the node 5, similarity of feature attributes corresponding to nodes in the second adjacency matrix that have a direct association relationship may be calculated.

A fifth operation includes determining fusion similarity based on the structural similarity of the any two nodes and the similarity of the feature attributes.

Specifically, fusion similarity of any two nodes is calculated according to the following formula:

$$TP_S = T_S^{\alpha + \beta \cdot P_S} \tag{10}.$$

$TP_S$ represents the fusion similarity, $P_S$ represents the similarity of the feature attributes of the any two nodes, $T_S$ represents the structural similarity of the any two nodes, $\alpha$ and $\beta$ are weighting parameters, and values of $\alpha$ and $\beta$ may be adjusted according to an actual requirement.

A sixth operation includes replacing element values corresponding to the any two nodes in the second adjacency matrix that have a direct association relationship with the calculated fusion similarity of the two nodes.

Herein, after element values corresponding to the any two nodes in the second adjacency matrix that have a direct association relationship are replaced with the calculated fusion similarity of the two nodes, a matrix A1' is generated, and $$A1' = TPs = \begin{bmatrix} 0 & 0.8 & 0.3 & 0.5 & 0.4 & 0.1 & 0 & 0 \\ 0.8 & 0 & 0.1 & 0.3 & 0.1 & 0.1 & 0 & 0 \\ 0.3 & 0.1 & 0 & 0.2 & 0.3 & 0.4 & 0.2 & 0.1 \\ 0.5 & 0.3 & 0.2 & 0 & 0.5 & 0.3 & 0 & 0 \\ 0.4 & 0.1 & 0.3 & 0.5 & 0 & 0.2 & 0 & 0 \\ 0.1 & 0.1 & 0.4 & 0.3 & 0.2 & 0 & 0.1 & 0.5 \\ 0 & 0 & 0.2 & 0 & 0 & 0.1 & 0 & 0.3 \\ 0 & 0 & 0.1 & 0 & 0 & 0.5 & 0.3 & 0 \end{bmatrix}.$$

A seventh operation includes replacing fusion similarity less than 0.3 with zero to generate a third adjacency matrix.

Herein, fusion similarity less than a preset threshold is deleted to simplify subsequent study and calculation of a reconstructed network model. The preset threshold may be flexibly set according to an actual requirement and is usually set between 0.2 and 0.4.

In this embodiment, the threshold is set to 0.3, and an obtained third adjacency matrix A2 is:

$$A2 = \begin{bmatrix} 0 & 0.8 & 0.3 & 0.5 & 0.4 & 0 & 0 & 0 \\ 0.8 & 0 & 0 & 0.3 & 0 & 0 & 0 & 0 \\ 0.3 & 0 & 0 & 0 & 0.3 & 0.4 & 0 & 0 \\ 0.5 & 0.3 & 0 & 0 & 0.5 & 0.3 & 0 & 0 \\ 0.4 & 0 & 0.3 & 0.5 & 0 & 0 & 0 & 0 \\ 0 & 0 & 0.4 & 0.3 & 0 & 0 & 0 & 0.5 \\ 0 & 0 & 0 & 0 & 0 & 0 & 0 & 0.3 \\ 0 & 0 & 0 & 0 & 0 & 0.5 & 0.3 & 0 \end{bmatrix}.$$

By applying this embodiment, the third adjacency matrix includes similarity of friendship chains of users, and includes similarity of feature attributes of the users, so that an adjacency matrix representing a reconstructed network model includes similarity of friendship chains of users, and includes similarity of feature attributes of the users, and a result obtained by performing corresponding community discovery, link prediction and figure representation based on a reconstructed social network model has more practical significance.

It should be understood that, a singular form "one" ("a", "an", "the") used herein, unless an exceptional case that is clearly supported in the context, aims to also include a plural form. It should also be understood that, the term "and/or" used herein indicates and includes any or all possible combinations of one or more associated listed items.

The sequence numbers of the preceding embodiments are for description purpose but do not indicate the preference of the embodiments.

In the several embodiments provided in the present disclosure, it should be understood that the disclosed method and apparatus may be implemented in other manners. For example, the apparatus embodiment described above is exemplary. For example, the partition of modules is a partition of logical functions and there may be other partition modes. For example, a plurality of modules or components may be combined or may be integrated to another system, or some characteristics may be ignored or not performed. In addition, the displayed or discussed mutual communication connections between the components may be implemented through some interfaces, indirect couplings or communication connections between the devices or modules, or electrical connections, mechanical connections, or connections in other forms.

The modules described as separation parts may be or may not be physically separated. The part displayed as modules may be or may not be a physical unit. That is, the modules may be located in a same place, or may be distributed to a plurality of network modules. Some or all of the modules need to be selected according to actual requirements to implement the purpose of the solution of the embodiments.

In addition, functional units in the embodiments may be all integrated in a processing module, each unit may be separately used as a module, or two or more modules are integrated in a module. The integrated module may be implemented in a form of hardware, or may be implemented in form of hardware plus a software functional module.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps of the foregoing method embodiments are performed. The foregoing storage medium includes various mediums capable of storing program codes, such as a portable storage device, a read-only memory (ROM), a magnetic disk, or an optical disk.

Alternatively, in the embodiments, if implemented in the form of software functional modules and sold or used as independent products, the integrated modules may be stored in a computer readable storage medium. Based on such an understanding, the technical solutions of the embodiments essentially, or the part contributing to the existing technology may be implemented in a form of a software product. The computer software product is stored in a storage medium and includes several instructions for instructing a computer device (which may be a personal computer, a server, a network device, or the like) to perform all or some of the methods described in the embodiments. The foregoing storage medium includes: various types of media that can store program code, for example, a mobile storage device, a ROM, a magnetic disk, or an optical disk.

A memory switching method and apparatus set forth in the embodiments use the foregoing embodiments as an example, but are not limited thereto. A person of ordinary skill in the art should understand that they may still make modifications to the technical solutions set forth in the foregoing embodiments or make equivalent replacements to some or all technical features thereof, as long as such modifications or replacements do not cause the essence of corresponding technical solutions to depart from the scope of the technical solutions of the embodiments.

The foregoing descriptions are example embodiments, but are not intended to limit the protection scope of the present disclosure.

INDUSTRIAL PRACTICABILITY

In the technical solutions of the embodiments, after n first communities are obtained by a partition, a label of a community node in each of the n first communities is updated according to a label propagation algorithm, thereby partitioning community nodes having a same label into a second community, to obtain m second communities; that is, first communities obtained by preliminarily partitioning are merged, thereby obtaining less second communities. This resolves a problem that granularity of communities obtained by a partition in the existing technology is relatively small, and further cannot satisfy requirements of some scenarios; and this achieves an effect of ensuring accuracy of the communities obtained by a partition and merging first communities into a second community to enable granularity of obtained communities to satisfy a partition requirement.

What is claimed is:

1. A community discovery method, the community discovery method being performed by one or more processors, and the community discovery method comprising:

partitioning nodes in a social network into community nodes partitioned into n first communities, each of the n first communities being associated with a corresponding community label, the corresponding label of each of the community nodes initially indicating a first community from among the n first communities to which the community node belongs, and n being an integer greater than or equal to 2;

updating the corresponding label of each community node comprised in the n first communities; and partitioning the community nodes into m second communities, each of the community nodes in each of the m second communities having a same label, and m being a positive integer less than n, wherein the updating comprises:
   traversing each community node to determine a first quantity for each of the community nodes, the first quantity indicating a quantity of community nodes in the first community to which the corresponding community node belongs;
   determining a second quantity for each of the community nodes, the second quantity indicating a quantity of community nodes comprised in a neighboring first community of the corresponding community node with a largest quantity of community nodes;
   determining structural similarity based on a first adjacency matrix and a second adjacency matrix, the first node quantity and the second node quantity; and
   updating the corresponding label of each community node to a label of the neighboring first community corresponding to the second quantity, based on the second quantity being greater than the first quantity.

2. The community discovery method according to claim 1, further comprising:
   determining whether a total quantity of community nodes whose labels change reaches a quantity threshold, after traversing each community node;
   traversing each community node again, based on the total quantity of the community nodes whose labels change reaching the quantity threshold; and
   ending traversal, based on the total quantity of the community nodes whose labels change not reaching the quantity threshold.

3. The community discovery method according to claim 2, further comprising sorting the community nodes based on importance of each community node,
   wherein the first quantity of each community node is determined after the sorting.

4. The community discovery method according to claim 3, wherein the sorting the community nodes based on importance of each community node comprises sorting the community nodes in descending order of clustering coefficients of the community nodes.

5. The community discovery method according to claim 3, wherein the sorting the community nodes based on importance of each community node comprises sorting the community nodes according to a Pagerank algorithm.

6. The community discovery method according to claim 3, wherein the sorting the community nodes based on importance of each community node comprises sorting the community nodes in descending order of degrees of the community nodes, and
   wherein the degrees of the community nodes represent quantities of the neighboring community nodes that are neighboring the community nodes.

7. A community discovery apparatus comprising:
   at least one memory configured to store computer program code; and
   at least one processor configured to access the at least one memory and operate according to the computer program code, the computer program code comprising:
      partitioning code configured to cause the at least one processor to partition nodes in a social network into community nodes partitioned into n first communities, each of the n first communities being associated with a corresponding community label, the corresponding label of each of the community nodes initially indicating a first community from among the n first communities to which the community node belongs, and n being an integer greater than or equal to 2;
      update code configured to cause the at least one processor to update the corresponding label of each community node comprised in the n first communities; and
      merging code configured to cause the at least one processor to partition the community nodes into m second communities, each of the community nodes in each of the m second communities having a same label, and m being a positive integer less than n,
   wherein the update code is further configured to cause the at least one processor to:
      traverse each community node to determine a first quantity for each of the community nodes, the first quantity indicating a quantity of community nodes in the first community to which the corresponding community node belongs;
      determine a second quantity for each of the community nodes, the second quantity indicating a quantity of community nodes comprised in a neighboring first community of the corresponding community node with a largest quantity of community nodes;
      determine structural similarity based on a first adjacency matrix and a second adjacency matrix, the first node quantity and the second node quantity; and
      update the corresponding label of each community node to a label of the neighboring first community corresponding to the second quantity, based on the second quantity being greater than the first quantity.

8. The community discovery apparatus according to claim 7, wherein the computer code further comprises:
   determining code configured to cause the at least one processor to determine whether a total quantity of community nodes whose labels change reaches a quantity threshold, after traversing each community node;
   first result code configured to cause the at least one processor to traverse each community node again based on the total quantity of the community nodes whose labels change reaching the quantity threshold; and
   second result code configured to cause the at least one processor to end traversal based on the total quantity of the community nodes whose labels change not reaching the quantity threshold.

9. The community discovery apparatus according to claim 8, wherein the computer code further comprises sorting code configured cause the at least one processor to sort the community nodes based on importance of each community node, and
   wherein the first acquiring code is further configured to cause the at least one processor to acquire the first quantity of each community node after the community nodes are sorted.

10. The community discovery apparatus according to claim 9, wherein the sorting code is further configured to cause the at least one processor to sort the community nodes in descending order of clustering coefficients of the community nodes.

11. The community discovery apparatus according to claim 9, wherein the sorting code is further configured to cause the at least one processor to sort the community nodes according to a Pagerank algorithm.

12. The community discovery apparatus according to claim 9, wherein the sorting code is further configured to cause the at least one processor to sort the community nodes in descending order of degrees of the community nodes, and wherein the degrees of the community nodes represent quantities of the neighboring community nodes that are neighboring to the community nodes.

13. The community discovery apparatus according to claim 7, wherein the community discovery apparatus comprises a server.

14. A non-transitory computer-readable storage medium storing instructions that cause at least one processor to perform a community discovery method comprising:
- partitioning nodes in a social network into community nodes partitioned into n first communities, each of the n first communities being associated with a corresponding community label, the corresponding label of each of the community nodes initially indicating a first community from among the n first communities to which the community node belongs, and n being an integer greater than or equal to 2;
- updating the corresponding label of each community node comprised in the n first communities; and
- partitioning the community nodes into m second communities, each of the community nodes in each of the m second communities having a same label, and m being a positive integer less than n, wherein the updating comprises:
- traversing each community node to determine a first quantity for each of the community nodes, the first quantity indicating a quantity of community nodes in the first community to which the corresponding community node belongs;
- determining a second quantity for each of the community nodes, the second quantity indicating a quantity of community nodes comprised in a neighboring first community of the corresponding community node with a largest quantity of community nodes;
- determining structural similarity based on a first adjacency matrix and a second adjacency matrix, the first node quantity and the second node quantity; and
- updating the corresponding label of each community node to a label of the neighboring first community corresponding to the second quantity, based on the second quantity being greater than the first quantity.

15. The non-transitory computer-readable storage medium according to claim 14, further comprising:
- determining whether a total quantity of community nodes whose labels change reaches a quantity threshold, after traversing each community node;
- traversing each community node again, based on the total quantity of the community nodes whose labels change reaching the quantity threshold; and
- ending traversal, based on the total quantity of the community nodes whose labels change not reaching the quantity threshold.

16. The non-transitory computer-readable storage medium according to claim 15, further comprising sorting the community nodes based on importance of each community node,
wherein the first quantity of each community node is determined after the sorting.

17. The non-transitory computer-readable storage medium according to claim 16, wherein the sorting the community nodes based on importance of each community node comprises sorting the community nodes in descending order of clustering coefficients of the community nodes.

* * * * *